(12) United States Patent
Sesselmann

(10) Patent No.: US 7,061,150 B2
(45) Date of Patent: Jun. 13, 2006

(54) DRIVE UNIT COMPRISING AN ELECTRIC MOTOR FOR ADJUSTING DEVICES IN MOTOR VEHICLES

(75) Inventor: Helmut Sesselmann, Steinach (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 0 days.

(21) Appl. No.: 10/489,536

(22) PCT Filed: Sep. 11, 2002

(86) PCT No.: PCT/DE02/03473

§ 371 (c)(1),
(2), (4) Date: Sep. 13, 2004

(87) PCT Pub. No.: WO03/026104

PCT Pub. Date: Mar. 27, 2003

(65) Prior Publication Data

US 2005/0040718 A1     Feb. 24, 2005

(30) Foreign Application Priority Data

Sep. 14, 2001   (DE) ................................ 101 47 225

(51) Int. Cl.
*H02K 5/00*     (2006.01)
(52) U.S. Cl. ..................... 310/89; 310/68 R; 310/71
(58) Field of Classification Search .............. 310/67 R, 310/68 R, 71, 68 B, 75 R, 89, 98; 475/149; 318/445
See application file for complete search history.

(56) References Cited

U.S. PATENT DOCUMENTS

| 5,245,258 | A | 9/1993 | Becker et al. |
|---|---|---|---|
| 5,770,902 | A | 6/1998 | Batten et al. |
| 5,777,410 | A * | 7/1998 | Asakura et al. ................ 310/71 |
| 6,236,176 | B1 | 5/2001 | Uebelein et al. |
| 6,629,905 | B1 | 10/2003 | Sesselmann et al. |
| 2002/0007691 | A1* | 1/2002 | Peter ........................ 74/473.12 |
| 2004/0100155 | A1* | 5/2004 | Sesselmann et al. ...... 310/75 R |

FOREIGN PATENT DOCUMENTS

DE            28 31 774 A1      1/1980

(Continued)

OTHER PUBLICATIONS

English Translation of International Preliminary Examination Report for PCT/DE2002/003473.

(Continued)

*Primary Examiner*—Thanh Lam
(74) *Attorney, Agent, or Firm*—Christie, Parker & Hale, LLP

(57) ABSTRACT

The invention relates to a drive unit having an electric motor, a power supply device that supplies power to the electric motor, at least one gear or driven gear that is connected to the electric motor and electronics unit for adjusting devices in motor vehicles. In the drive unit, the electronics unit and power supply device are integrated into the housing of the electric motor and the electronics unit and power supply device carry out both control and regulatory functions of the electric motor and control, regulatory and monitoring functions of the adjusting devices.

22 Claims, 6 Drawing Sheets

FOREIGN PATENT DOCUMENTS

| | | |
|---|---|---|
| DE | 28 31 774 C2 | 1/1980 |
| DE | 40 19 787 A1 | 1/1991 |
| DE | 196 33 415 C1 | 11/1997 |
| DE | 197 23 664 A1 | 12/1997 |
| DE | 199 44 915 A1 | 3/2001 |
| WO | WO 98/40945 | 9/1998 |

OTHER PUBLICATIONS

International Search Report of PCT/DE02/03473, dated Mar. 4, 2003.

International Preliminary Examination Report of PCT/DE02/03473, dated Nov. 11, 2003.

* cited by examiner

DRIVE UNIT COMPRISING AN ELECTRIC MOTOR FOR ADJUSTING DEVICES IN MOTOR VEHICLES

CROSS-REFERENCE TO RELATED APPLICATION(S)

This application is a National Phase Patent Application of International Application Number PCT/DE02/03473, filed on Sep. 11, 2002, which claims priority of German Patent Application Number 101 47 225.0, filed on Sep. 14, 2001.

BACKGROUND OF THE INVENTION

An electric motor is known from DE 28 31 774 C2 with a disc rotor in the flat air gap having a non-ferrous stator winding which is associated at least on one side with a permanent magnetic ring with an axially magnetised segment and on both sides with soft-magnetic flat discs for the magnetic reflux. Coaxial with the rotor shaft is an electrodynamic tachogenerator which is arranged so that the most compact combination possible is produced for the electric motor and tachogenerator.

The known combination of electric motor and tachogenerator includes the coaxial function elements of the electric motor and tachogenerator arranged in a row, whereby each unit is fully functioning per se when the individual function elements are separated from each other.

The use of maintenance-free electronically commutated motors has been problematic, given on the one hand the on-board mains voltage available up to now of 12 V in motor vehicles, and on the other hand the costs for such electronic commutating circuits. With this low voltage, considerable currents have to be forced through the electronic commutation circuit as a result of the power required.

For both mechanically commutated electric motors and electronically commutated electric motors for use with adjusting devices in motor vehicles, a considerable amount of space has to be provided to include the gear parts required for the adjusting devices. In addition, as a result of the markedly different surrounding conditions during operation, and owing to the operating safety required for such drive units, a considerable manufacturing expense is also incurred.

SUMMARY

The object of the present invention is to provide a compact, lightweight drive unit which is cost-effective to manufacture and use and which includes an electric motor, power supply device, gearing and electronics with integrated power supply, control and regulating action for the drive unit as well as control and monitoring of the adjusting device driven by the drive unit.

The solution according to the invention provides a compact, lightweight drive unit which is cost-effective to manufacture and use and which includes an electric motor, power supply device, gearing and electronics with integrated power supply, control and regulating action of the drive unit as well as control and monitoring of the adjusting device driven by the drive unit. Since the drive unit combines all the component parts required for the power supply, control and regulation of the drive unit as well as control and monitoring of the adjusting device in one housing, the prerequisites are provided for a synergetic fusion of electronic components with, for example, anti-nip protecting electronics as well as electronics and mechanical components such as parts supporting the housing of the electric motor and the electronic components. As such, the drive unit can be operated in conjunction with the adjusting device driven by same in the manner of a servo motor. Through the synergetic combining of the current rectifier circuit, which is required for electronic commutation but which increases costs, with a monitoring electronics unit for the adjusting device driven by the drive unit a cost effective manufacture of the overall system is possible.

The components which can be used in the present invention for different tasks can be a micro controller, a plug or plug system, a position detection system, and a conductor plate or a punched grid system. Through the integration of the different component parts in the housing of the electric motor there is no need to provide additional measures for protecting and where necessary screening the electronic component parts.

The electronics and power supply device can preferably be integrated in the housing cover and a plug or plug system can be guided through the outside of the housing cover.

Through these modifications to the housing it becomes easier to produce the compact drive unit and assembly is simplified through the required connection of the plug or plug system with a voltage source and where necessary a central control and regulating unit of a motor vehicle.

A further reduction in the number of component parts is achieved if a conductor plate holding the electronics and power supply components is formed as part of the housing, particularly if the conductor plate is a constituent part of the housing cover.

In an alternative embodiment, the conductor plate can be injection moulded in the housing cover.

Fixing one or more of the electronics, power supply components, conductor plate, and punched grid system on the inside of the housing cover provides effective protection against moisture and against mechanical stresses.

Inserting or clipping one or more electronic or power supply components in recesses on the inside of the housing cover enables simple assembly and simple exchange for repair and test purposes as well as a clear association of several electronic or power supply components.

The push-fit or clip connection between the electronic or power supply components and the inside of the housing cover can be combined with the arrangement of sensor elements which are directed into the inside of the housing. Through the integration of these sensor elements, for example in an electronic component, a clear association and short transmission paths for minimizing harmful influences are provided.

The solution according to the present invention is particularly suitable for drive units for adjusting devices with an anti-nip protection device such as window lifters, sliding roofs or seat adjusters, in which during a closing or adjusting process there is the danger of parts of a person's body or objects becoming jammed in the device. By using the electronic components both for controlling and regulating the drive unit and for monitoring functions for an anti jamming device, sensor signals which are required for the electronic commutation of the electronically commutated drive motor such as position, speed and acceleration signals, are also provided and evaluated for the electronic components provided for the anti jamming device. Through this synergetic combining of the detection and evaluation electronics it is possible to manufacture the overall system cost effectively despite a cost-increasing rectifier circuit which is required for the electronic commutation.

The synergy effect can be achieved by providing common sensor devices for the electronics of the drive unit and the electronics of the anti jamming device. More particularly, the anti jamming protection electronics and the electronics for controlling the rectifier circuit for feeding electronically commutated drive motors may form one unit in which the electronic elements are used jointly.

The sensor signals detected for commutating the electronically commutated motor, such as position, speed and acceleration signals, are emitted by the structural elements of the anti jamming device and are evaluated by the anti jamming device.

Apart from, or in addition to, a synergetic of electronic components both for controlling a rectifier circuit of the electronically commutated electric motor and also for its anti jamming protection device, the common electronics can also undertake the control of actuators of other functional units of the vehicle such as a door lock, steering wheel, rear mirror, or the like.

Furthermore, in connection with a memory device for adjusting the seat parameters, the inner and outer mirrors and the steering wheel, a priority control can be provided which ensures time sequential processing of adjusting commands according to a fixed hierarchy. Such a priority control enables a reduction in hardware costs since the same structural elements are used for controlling the different actuators.

As an alternative to wire-bonded communication between the electronics and the actuators, a wireless transfer of control and sensor signals can also be provided.

DETAILED DESCRIPTION OF THE INVENTION

Figure 1:
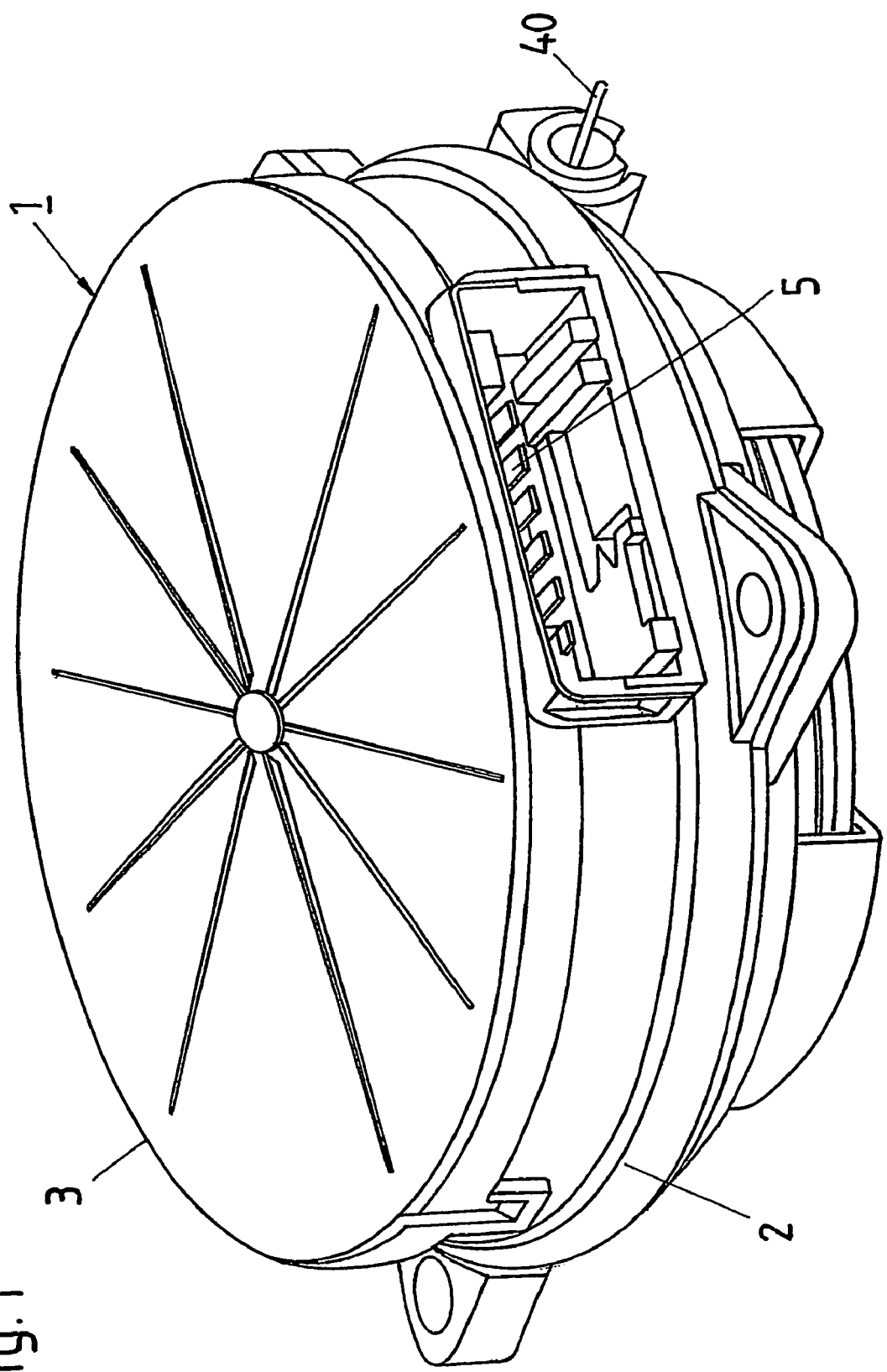
FIG. 1 a perspective view of a drive unit having an electronically commutated motor with integrated electronics, rectifier circuit and anti jam protection device.

The drive unit illustrated in FIGS. 1 to 4 for a cable window lifter in a motor vehicle includes several components, namely an electric motor 9, a power supply device supplying the electric motor 9, gearing 94 or output 4 connected to the drive shaft of the electric motor 9 and an electronics unit for controlling and regulating the electric motor 9. The overall drive unit is mounted in a housing 1 of the electric motor 9 which includes two housing shells, for example housing base 2 and housing cover 3. The housing base 2 has several flanges 21, 22, 23 for affixing the drive unit on a support plate, door module or body part. The output driven by the electric motor 9 includes in the present embodiment a cable drum 4, on which a cable 40 is wound up. The output is moved in one or other direction for lowering and lifting the window pane of the motor vehicle.

In order to connect the drive unit to a voltage source, for example to the battery of the vehicle, as well as to operate elements such as switches, buttons, or a central control and regulating device of the vehicle, there is a plug or plug system 5 which has several contact pins or sockets, and which can be connected to a corresponding counter plug. The counter plug can be inserted in the opening of the plug or plug system 5 and connected to the plug or plug system 5, for example by a detent connection. In this manner, an electrical connection with the battery, switches, buttons or central control and regulating device is produced.

The housing cover 3 holds the control electronics for the electric motor and for the anti jamming device 86 of the cable window lifter. The rectifier and electronics components 6, 7 and 8 as well as additional structural elements (not listed in detail) of the rectifier and anti jamming protection electronics 86 are mounted on a conductor plate 10 which is either part of the housing 1 or forms the cover face of the cover 3.

Figure 3:
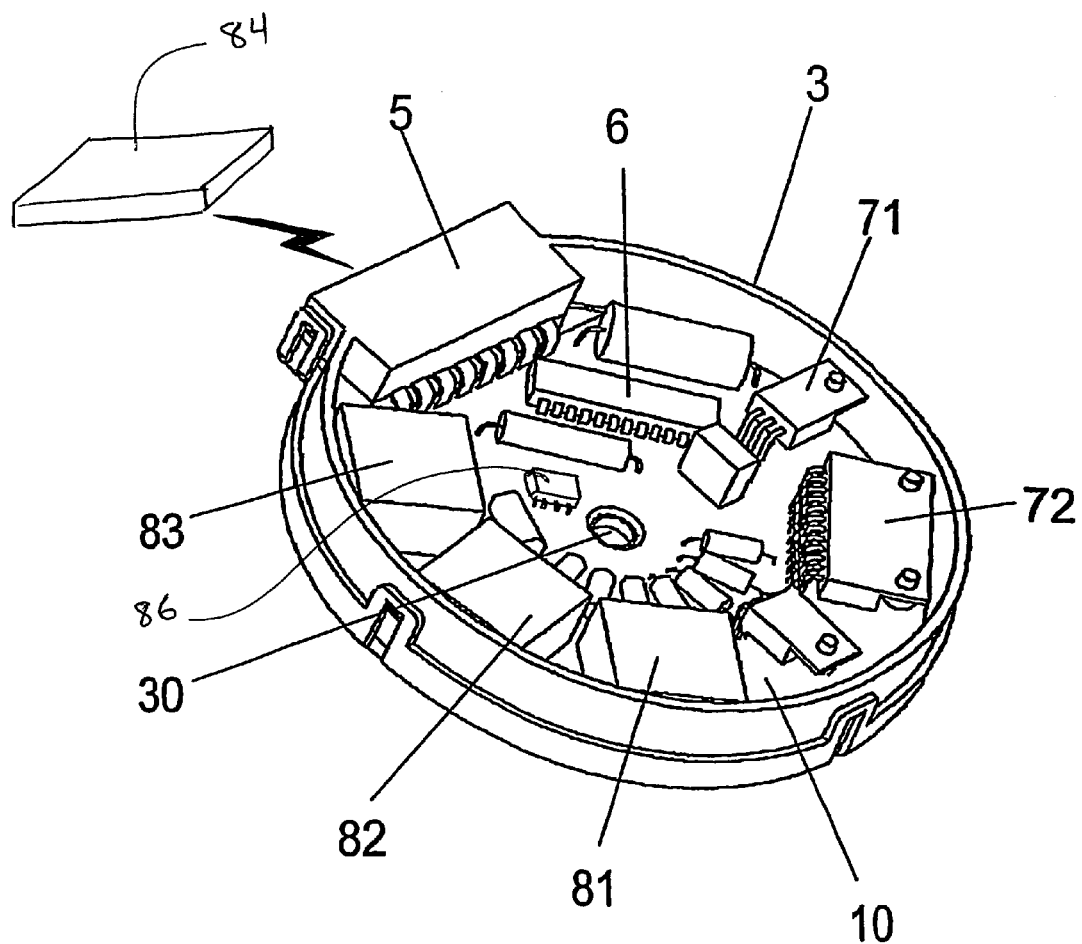
FIG. 3 a perspective view of the inside of a housing cover with electronic and rectifier components.

As can be seen from the perspective illustration of the inside of the cover 3 according to FIG. 3 next to the plug or plug system 5 there is a micro controller 6, a semiconductor end stage 71, a chip 72 containing several power semiconductors (for example in a bridging circuit), as well as specific components for certain use of active or passive structural elements 81, 82 and 83. A central recess 30 serves to hold and support the drive shaft of the electric motor 9 which is connected on the opposite side to a gearing 94 or output, which in the present embodiment comprises the cable drum 4.

In an alternative embodiment to the conductor plate 10 illustrated in FIG. 3, a stamped grid can be injected into the housing cover 3, or the stamped grid can be formed as part of the housing cover 3 or as the cover itself, using injection moulded plastics.

The electric motor which is preferably formed as an electronically commutated motor can comprise a direct current machine, an active and reactive reluctance machine, a synchronising machine, a Lynch motor or the like.

A current rectifier and anti jam protection electronics unit 86 integrated in the housing cover 3 is provided, functioning both to control and regulate the electric motor, and to provide the anti jam protection electronics 86. By coupling the drive shaft of the electric motor 9 to the cable drum 4 of a window lifter, it is possible to determine the position of the window pane articulated by the cable window lifter from the revolutions and angular position of the electric motor 9. Furthermore, the adjusting speed of the window pane is proportional to the speed of the electric motor 9. In the same way, the acceleration or braking of the window pane is proportional to the angular acceleration of the electric motor 9. The position, speed and acceleration signals are required for the electronic commutation of the electronically commutated electric motor 9, more specifically for its magnetic field control. The sensor signals are supplied to the micro controller 6 which controls the structural elements of the rectifier circuit 72 through the semiconductor end stage 71.

DE 196 33 415 and WO 98/40945 describe the techniques of using sensor signals to control the electric motor 9 (for example in the form of a speed regulation with subordinate current regulation) in conjunction with the determination of the window pane position by detecting the revolutions and angular position of the electric motor 9 and regulating the anti jamming protection.

Figure 2:
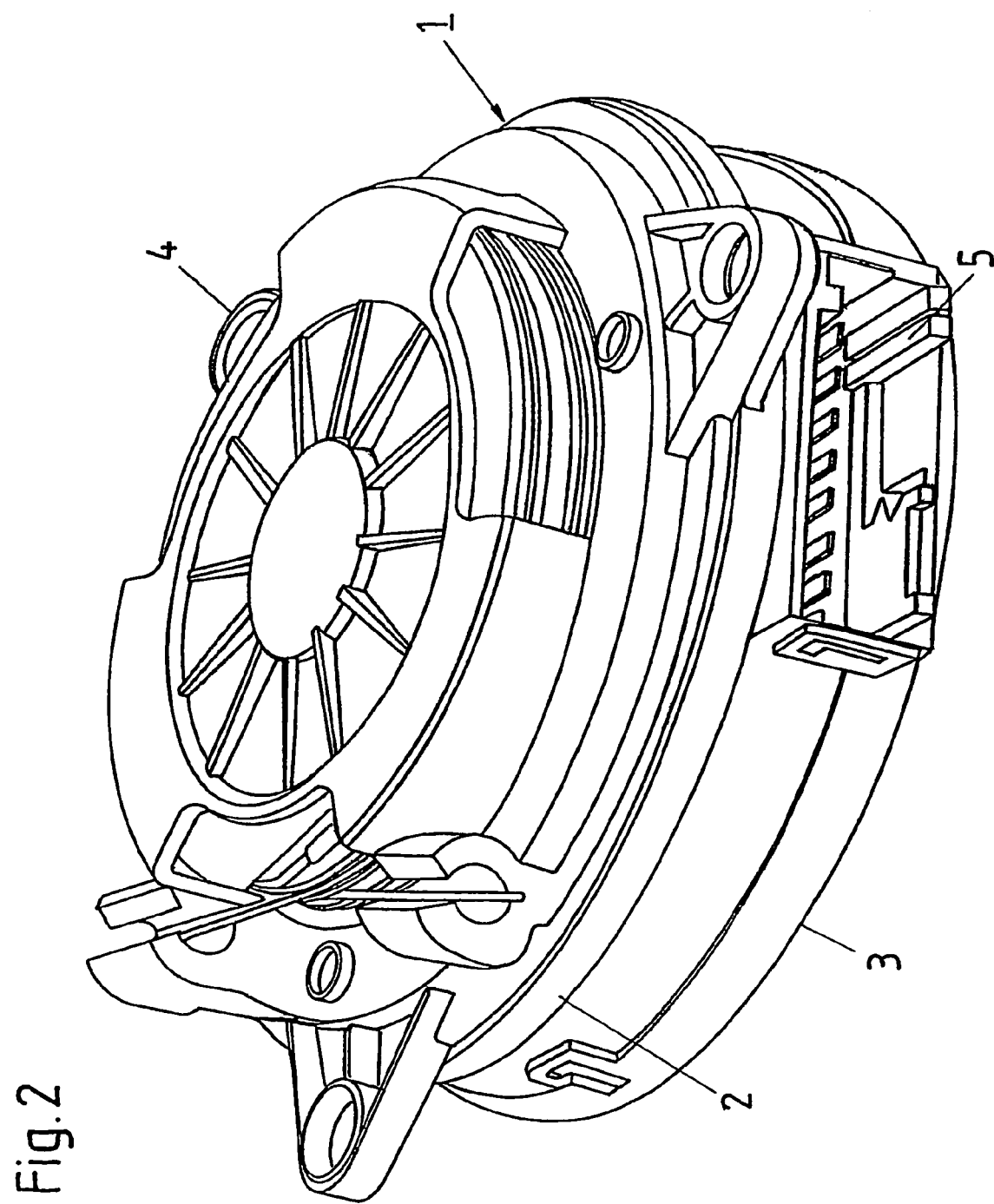
FIG. 2 a perspective view of the drive unit provided for a cable window lifter according to FIG. 1.
Figure 4:
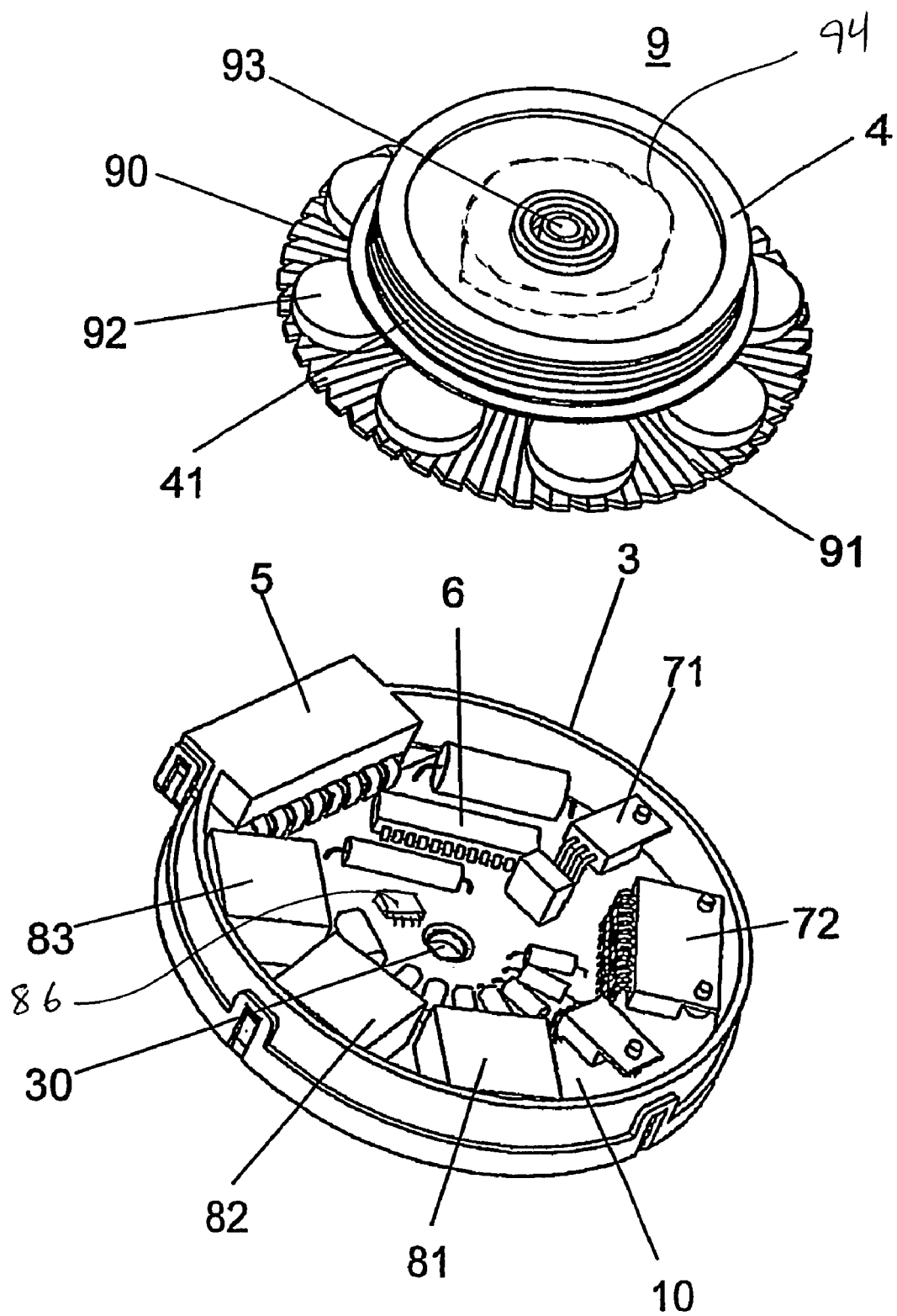
FIG. 4 an exploded view of an electronically commutated disc rotor motor and the electronics and rectifier components mounted on the inside of a housing cover corresponding to the drive unit according to FIG. 2.

FIG. 4 shows in an exploded view corresponding to the drive unit shown in FIG. 2 an electronically commutated disc rotor motor and the electronics and rectifier components mounted on the inside of a housing cover. In this figure, the compact method of construction is shown incorporating all the mechanical, electric and electronic components for the drive unit operating in the manner of a servo motor. In this figure the electronic components integrated in the housing cover 3 correspond to those shown in FIG. 3. The electronically commutated disc rotor motor 9 includes a rotor disc 90 provided with conductor loops 91, and which is located in a magnetic field formed by permanent magnets 92. The motor shaft 93 is connected as an output to the cable drum 4 which has spiral cable guide grooves 41.

Figure 5:
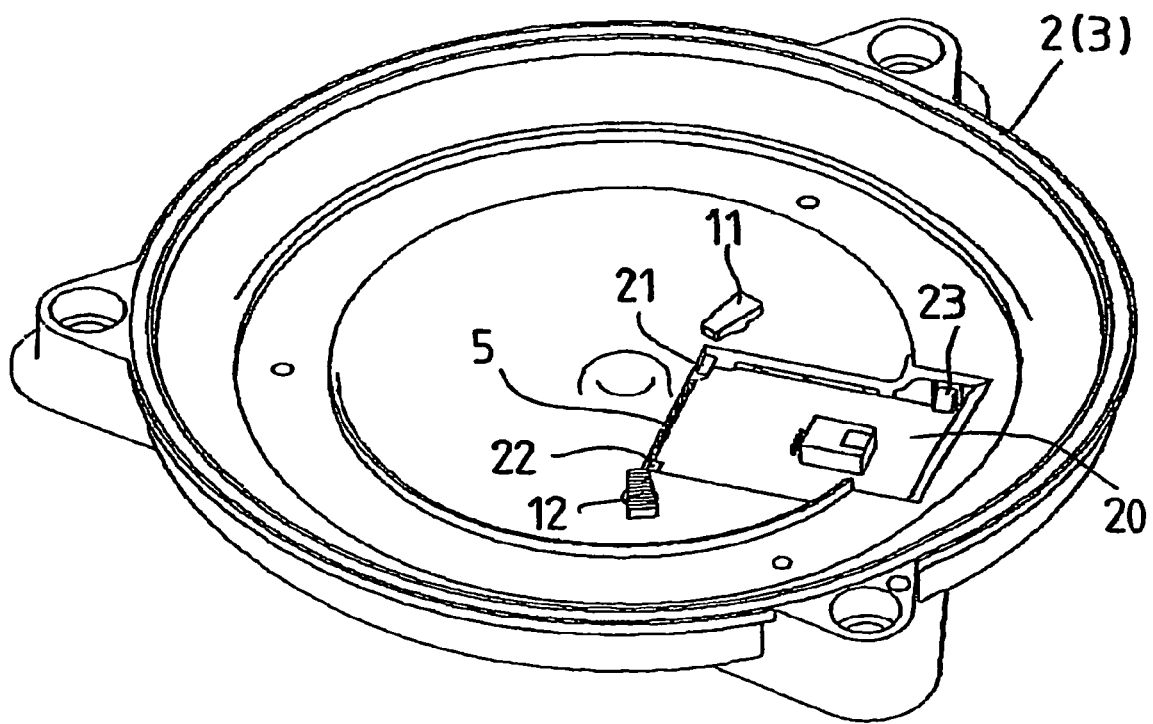
FIG. 5 a perspective view of the inside of a housing cover of a drive unit with integrated sensor and recess for holding a clip-in electronic component.
Figure 6:
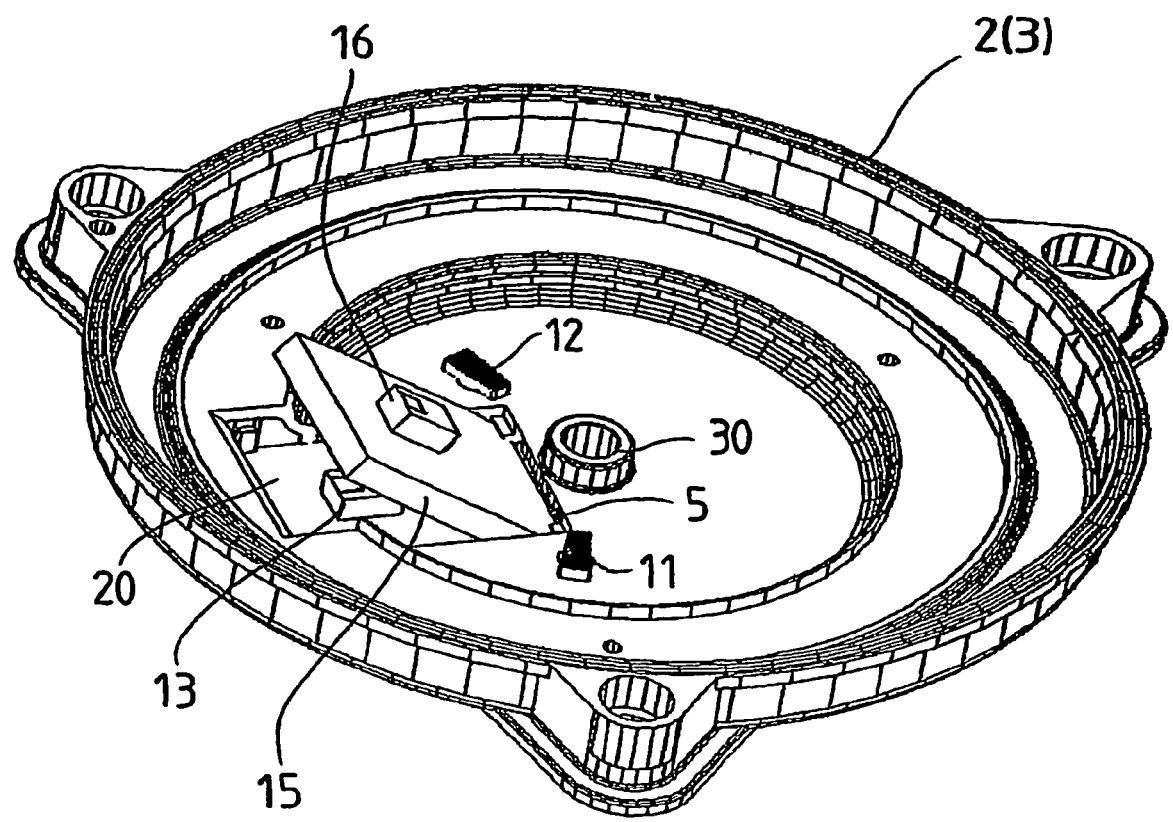
FIG. 6 a perspective view corresponding to FIG. 5 when fitting an electronic component into a recess of the housing cover.

FIGS. 5 and 6 show an alternative embodiment wherein the control electronics for an electric motor as well as monitoring electronics provided for the relevant adjusting device or actuator 84 (and where necessary electronics for controlling further function units such as a door lock or a door mirror) are combined in connection with an adjusting device such as a cable window lifter in one electronic component 15. FIG. 6 shows the electronic component 15 integrated in a housing base 2 or alternatively in a housing cover 3.

To this end, the housing base 2 has a recess 20 which is provided with clips 21, 22, and 23 for inserting and locking the electronic chip 15, and with a plug or plug system 5. A sensor element 13, which can be formed as a magnetic or optical sensor, is inserted in the recess 20. Brushes 11 and 12 are provided on each side of the recess 20 for brush-commutated electric motors and a socket 30 for the motor shaft of the electric motor is mounted in the middle of the housing base 2.

As can be seen in FIG. 6, the electronic component 15 is inserted in the recess 20 so that the contact elements provided on the electronic component 15 enter into engagement with contacts of the plug or plug system 5 to produce the electrical connection with a voltage source, operating elements and/or a central control and regulating device. The electronic component 15 has a housing-like protrusion 16 which aligns with the sensor element 13 and which surrounds the sensor element 13 when the electronic component 15 is completely inserted in the recess 20. Alternatively, the sensor element 13 can be mounted directly in the protrusion 16 on the electronic component 15.

The electronic component 15 comprises different embodiments depending on the type of electric motor.

In a first embodiment for brush-commutated machines, contact with the brushes 11 and 12 is produced through the contacts of the electronic component 15 and the plug or plug system 5, and the electronic component 15 contains common components for controlling and regulating the brush-commutated electric motor and anti-jam protection device.

In a second embodiment for electronically commutated machines, contact is produced through the contact of the electronic component 15 and the plug or plug system 5 with the power switches and coils of the electronics unit which contains both an anti jam circuit and a circuit for controlling the electronically commutated electric motor, so that a so-called "mechatronic unit" is formed.

The invention claimed is:

1. A drive unit comprising:
an electric motor having a housing;
a power supply device feeding the electric motor;
at least one gearing connected to the electric motor; and
an electronics unit for adjusting devices in motor vehicles;
wherein any one of the electronics unit and power supply device forms a single continuous one-piece unit with the housing without separate fixing means to connect any one of the electronics unit and power supply device to the housing; and
wherein the electronics unit carries out both control and regulating functions of the electric motor and also control, regulating and monitoring functions of the adjusting devices.

2. The drive unit of claim 1, wherein any one of the electronics unit and the power supply device forms a single continuous one-piece unit with a housing base or housing cover; and
wherein a plug or plug system is guided to the outside of the housing base or housing cover.

3. The drive unit of claim 1 or 2, wherein a conductor plate holding the components of the electronics unit and power supply device is formed as part of the housing, housing base or housing cover.

4. The drive unit of claim 3, wherein the conductor plate is a constituent part of the housing, housing base or housing cover.

5. The drive unit of claim 4, wherein the conductor plate is injection moulded in the housing base or housing cover.

6. The drive unit of claim 1, wherein at least one component of the group comprising the electronics unit, power supply device and a conductor plate is fixed on the inside of the housing base or housing cover.

7. The drive unit of claim 6, wherein at least one component of the group comprising the electronics unit and power supply device is inserted or clipped into a recess on the inside of the housing base or housing cover.

8. The drive unit of claim 1, wherein a sensor element directed into the inside of the housing is integrated in the component of at least one of the group comprising the electronics unit and power supply device.

9. The drive unit of claim 1 for adjusting devices with an anti jamming device, wherein the electric motor comprises an electronically commutated motor which is fed through at least one of the group comprising the electronics unit and power supply device; and
wherein structural elements of the electronics unit are a constituent part of the anti jamming device.

10. The drive unit of claim 9, wherein detected sensor signals of at least one of the group comprising position, speed, and acceleration of the electronically commutated motor are emitted at structural elements of the anti jamming device and are evaluated by the anti jamming device to commutate the electronically commutated motor.

11. The drive unit of claim 9 or 10, wherein the electronically commutated motor has a disc like permanent magnet rotor and fixed exciter coils; and
wherein at least a part of the structural parts of the electronically commutated motor and gearing are alternately supported or serve as a supporting component part of the electronically commutated motor or gearing.

12. The drive unit of claim 1, wherein the electronics unit and power supply device additionally undertake the control of actuators of further function units of the motor vehicle such as door lock, steering wheel, rear mirror or the like.

13. The drive unit of claim 12, wherein the electronics unit and power supply device is provided with a priority or sequence control for predetermined time sequential processing of adjusting ideal values.

14. The drive unit of claim 12 or 13, further comprising a wireless connection between the electronics unit and power supply device and the actuators.

15. The drive unit of claim 1, wherein the electronics unit and power supply device contains a micro controller and that the micro controller incorporates the control, regulating and monitoring functions of the at least one of the group comprising electric motor, the adjusting device driven by the electric motor and further function units of the motor vehicle.

16. The drive unit of claim 11, wherein at least one component part of the electronically commutated motor undertakes a function of at least one of the group comprising the electronically commutated motor, electronics unit and power supply device.

17. The drive unit of claim 16, wherein the component part of the electronically commutated motor is selected from the group comprising the motor shaft, the magnetic reflux, the housing shell on the motor side, the gearing and a mechanical component part.

18. The drive unit of claim 17, wherein the mechanical component part comprises the housing shell on the gearing side.

19. A drive unit comprising:
an electric motor having a housing;
a conductor plate formed with the housing, wherein the conductor plate defines at least a portion of the housing;
a power supply device feeding the electric motor;
at least one gearing connected to the electric motor; and
an electronics unit for adjusting devices in motor vehicles;
wherein the electronics unit and the power supply device are mounted inside the housing and operatively coupled to the conductor plate; and
wherein the electronics unit carries out both control and regulating functions of the electric motor and also control, regulating and monitoring functions of the adjusting devices.

20. The drive unit of claim 19, wherein the conductor plate is injection moulded in a base of the housing or a cover of the housing.

21. A drive unit comprising:
an electric motor having a housing;
a power supply device feeding the electric motor;
at least one gearing connected to the electric motor; and
an electronics unit for adjusting devices in motor vehicles;
wherein any one of the electronics unit and power supply device is inseparably embedded in at least a portion of the housing; and
wherein the electronics unit carries out both control and regulating functions of the electric motor and also control, regulating and monitoring functions of the adjusting devices.

22. The drive unit of claim 21, wherein a plug or plug system operatively coupled to any one of the electronics unit and the power supply device is guided to the outside of a base of the housing or a cover of the housing.

* * * * *